United States Patent [19]

Maeda et al.

[11] 4,221,960
[45] Sep. 9, 1980

[54] METHOD FOR STABILIZING A MODULATED LIGHT RAY

[75] Inventors: Kiyoshi Maeda, Takatsuki; Kyohei Fujisawa, Kyoto, both of Japan

[73] Assignee: Dainippon Screen Seizo Kabushiki Kaisha, Kyoto, Japan

[21] Appl. No.: 960,058

[22] Filed: Nov. 13, 1978

[30] Foreign Application Priority Data

Nov. 28, 1977 [JP] Japan .................. 52-142507

[51] Int. Cl.$^2$ .......................... H01S 3/10; G11B 7/00
[52] U.S. Cl. ................. 250/205; 179/100.3 N; 331/94.5 S; 346/76 L
[58] Field of Search ............... 250/205; 179/100.3 N, 179/100.3 P; 346/76 L, 108; 331/94.5 S; 358/280, 285, 128; 365/206

[56] References Cited

U.S. PATENT DOCUMENTS

| 4,068,197 | 1/1978 | Yamazaki et al. | 331/94.5 S |
| 4,071,751 | 1/1978 | Waksberg | 331/94.5 S X |
| 4,114,180 | 9/1978 | Kayanuma | 250/205 X |

*Primary Examiner*—David C. Nelms
*Assistant Examiner*—Edward P. Westin
*Attorney, Agent, or Firm*—Daniel M. Rosen

[57] ABSTRACT

A light ray emitted by a light source and which is to be modulated by an acoustic-optical modulator element is stabilized by its intensity being detected before it enters the acoustic-optical modulator element and being used to produce correction signals. The correction signals are used to amplitude-modulate a high-frequency carrier in reverse phase to the change of intensity of the light ray, to produce corrected carrier signals. Then the corrected carrier signals are further amplitude-modulated by control signals to produce modulator signals which are used to modulate the light ray in the acoustic-optical modulator element.

1 Claim, 4 Drawing Figures

METHOD FOR STABILIZING A MODULATED LIGHT RAY

This invention relates to a method for stabilizing the intensity of a light ray which is to be modulated by an optical modulator element, and more particularly the field of application of the invention, in a preferred embodiment, is the stabilization of the intensity of a light ray which is emitted by a laser and is used in a scanning exposure head of a scanning picture recorder such as a facsimile reproducer or the like, and which is to be modulated by an optical modulator element comprising an acoustic-optical crystal.

In an exposure head for a picture scanning reproducer, and the like, a laser tube is often used nowadays, because of its high brightness, monochromaticity, parallellism of beam, and so forth. An acoustic-optical modulator element has been developed as an optical modulator element for a laser light ray. Thus an exposure head comprising a combination of a laser tube and an acoustic-optical modulator element has been developed.

However, in such an exposure head the intensity of the laser from the laser tube varies over a relatively long time period, and thus the intensity of the light ray after modulation for printing varies also. In order to overcome this defect various methods have been developed.

In one conventional stabilizing method a part of the light ray has been detected, after the light ray has been modulated, by a photoelectric element, and the detected signal is returned to the acoustic-optical element via a drive circuit for the acoustic-optical element. Thus the light ray is stabilized by a feedback loop comprising a photoelectric circuit and a drive circuit.

In FIG. 1 is shown one embodiment of such a conventional stabilizing method. A laser ray generated from a laser 1 is incident on an acoustic-optical modulator element 2 and is modulated therein according to picture signals obtained by scanning an original picture. While the modulated laser ray is projected to a photo-sensitive material for recording the reproduction picture, a part of it is separated by a beam splitter 3 and is sent to a light detector 4, such as a photoelectric element. The produced signal from the light detector 4 is fed to an operation circuit 5 and is compared there with the picture signal so as to detect the change of intensity of the laser ray, thereby obtaining a correction signal corrected by an amount corresponding to the change of intensity of the laser ray. The correction signal from the operation circuit 5 actuates a drive amplifier for the optical modulator element 2 which operates it in such a way as to stabilize the modulated laser ray.

In this case, however, since the ultrasonic wave signal which propagates in the acoustic-optical crystal according to the picture signal has a time delay (usually a few microseconds), when the amount of feedback of the correction signal increases, in a frequency range in which the period of the ultrasonic wave is smaller than the time delay, the negative feedback often becomes positive feedback, due to the phase delay of the feedback signal. This means that the amount of feedback returned to the acoustic-optical modulator element 2 must be restricted.

Further, when the axis of the light incident on the light detector 4 is changed, the amount of feedback is substantially changed. In the conventional method, this change has been corrected by an optical or an electric adjustment, and thereby the amount of feedback before the change has been restored. However, since the control system for stabilizing the modulated laser ray is formed as a feedback loop, and its components are related closely with one another, such an adjustment is inevitably complicated.

In another conventional method for stabilizing the modulated laser ray the change of the intensity of the laser ray, which occurs over a relatively long period, is utilized. That is, a ND filter is mounted on a rotary disc and the laser ray is passed through it. Different parts of the ND filter are of different densities, so that when the intensity of the laser ray is reduced the disc can be rotated so as to bring a less dense portion of it into the ray, thereby ensuring that the amount of transmitted light is kept constant.

In still another conventional method the change of the intensity of the laser ray is first corrected by an optical modulator element, which is used for this purpose only, and then the corrected laser ray is modulated by the main optical modulator element according to the picture signals. However, this means high cost, because two optical modulator elements have to be provided.

The conventional methods described above are quite effective; however, they have defects, such as being useless in the high-frequency range, high cost, etc.

Therefore it is an object of the present invention to provide a method for stabilizing the intensity of a light ray free from the aforementioned defects, which is readily adjustable.

According to the present invention, a method for stabilizing the intensity of a light ray emitted by a light source and modulated in an optical modulator element according to control signals, comprises detecting the change of intensity of the light ray before it enters the optical modulator element and producing correction signals in accordance therewith, amplitude-modulating a high-frequency carrier by the correction signals in reverse phase to the change of intensity of the light ray to produce corrected carrier signals, amplitude-modulating the corrected carrier signals by the control signals to produce modulator signals, and modulating the light ray by the modulator signals in the optical modulator element.

In order that the present invention may be better understood, a preferred embodiment will now be described with reference to the accompanying drawings, in which.

Figure 1:
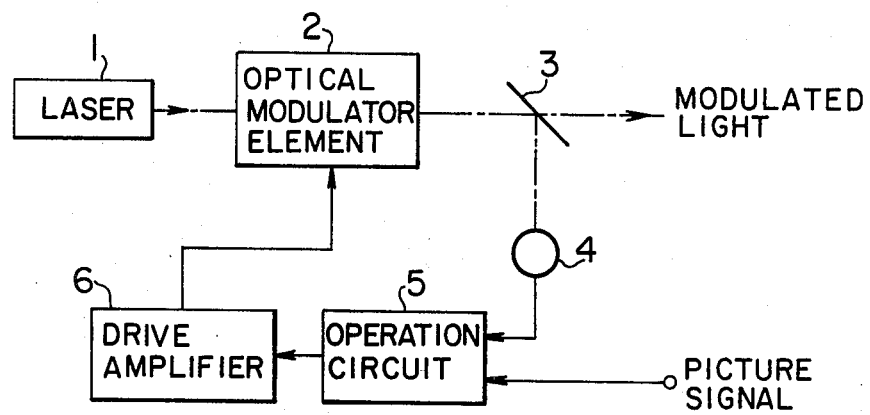
FIG. 1 is a schematic view of a conventional method for stabilizing a modulated laser ray.
Figure 2:
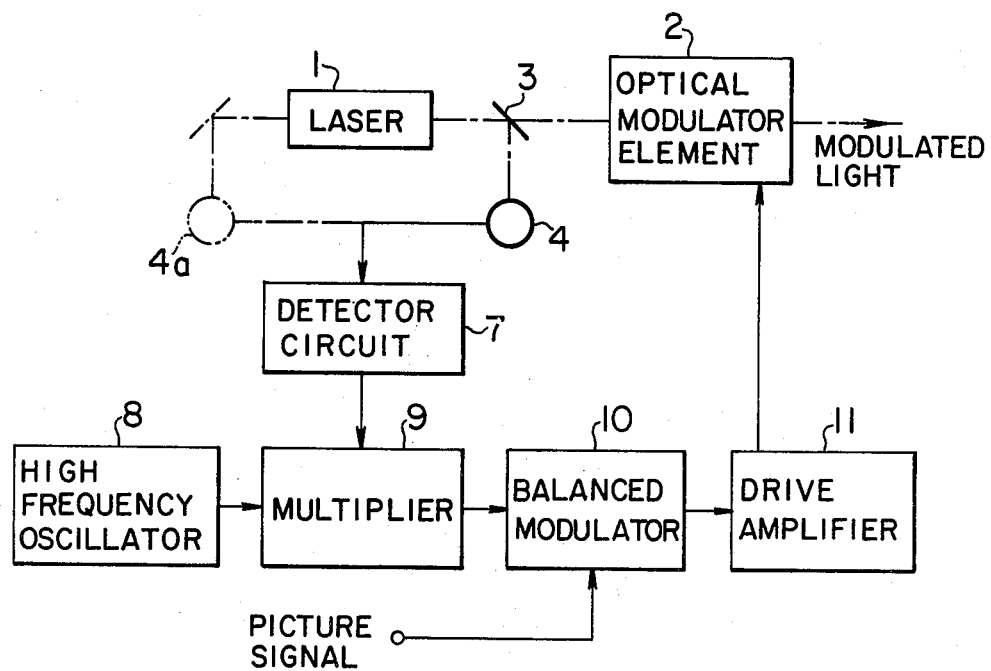
FIG. 2 is a schematic view of a method for stabilizing a modulated laser ray according to the present invention.

In FIG. 2 there is shown in block diagram a method for stabilizing a modulated laser ray according to the present invention.

Figure 3:
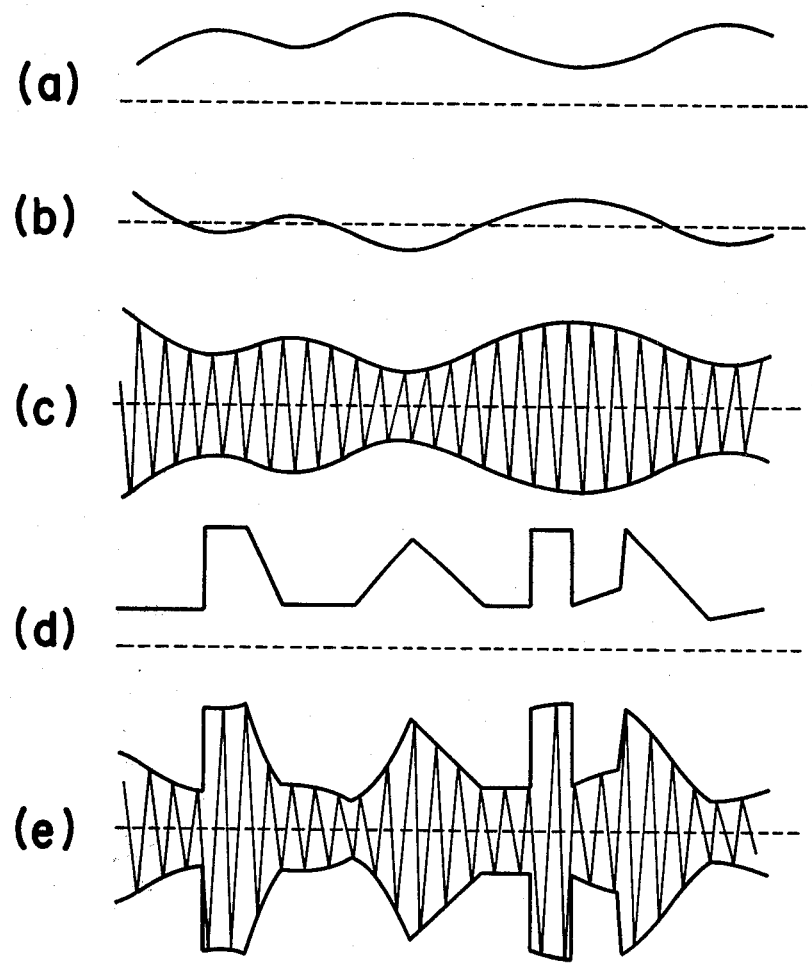
FIG. 3 is a schematic view of signals in the method of FIG. 2.

A laser ray emitted from a laser 1 is incident to an acoustic-optical modulator element 2 through a beam splitter 3 by which a part of the laser ray is divided and is incident a light detector 4 in which a detector signal indicating the change of the intensity of the laser ray, as shown in FIG. 3(a), is produced.

This detector signal is fed to a detector circuit 7 in which a correction signal for correcting the light intensity, i.e. a signal representing the variation of the light intensity about some middle value, is produced, which is produced to have a reverse phase to the change of intensity of the laser ray.

This correction signal is input to a multiplier 9 together with a high-frequency signal generated from a high-frequency oscillator 8. Here the high-frequency signal is amplitude-modulated by the correction signal, and a corrected carrier signal, as shown in FIG. 3(c), is produced.

This corrected carrier signal is input to the balanced modulator 10 and is there further amplitude-modulated by a picture signal, such as the one shown for the purposes of example in FIG. 3(d). This produces a modulator signal, as shown in FIG. 3(e), which is then fed to the acoustic-optical modulator element 2 via a high-frequency drive amplifier 11, thereby modulating the laser ray which is incident to the modulator element 2. Thus a reproduction picture is recorded on a photo-sensitive material according to the picture signals by the modulated laser ray.

Figure 4:
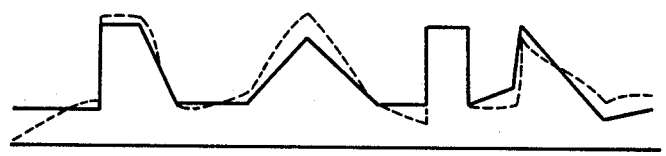
FIG. 4 is a schematic view of a signal, showing the intensity of the modulated laser ray, in which the signal corrected by the present invention is shown by solid lines, while the signal that would be produced if the present invention were not used for correction is shown by dotted lines.

In FIG. 4 the intensity of the corrected laser ray modulated in the acoustic-optical modulator element 2 is shown by the solid line, and the intensity that the ray would have if no correction were applied is shown by the dotted line.

From the above description it is readily understood that according to the present invention the laser ray modulated by the acoustic-optical modulator element will have an intensity corresponding very well to the picture signal, the errors due to variation in the laser output being eliminated. Further, since according to the present invention in the stabilizing system there is no feedback loop incorporating an acoustic-optical modulator element with a relatively large time delay, the laser ray can be stabilized to as high a frequency as is practicable in view of the frequency properties of the light detector. Although the present invention has been shown and described in terms of a preferred embodiment thereof, various changes and modifications of the form and the detail thereof can be made therein without departing from the scope of the invention. For instance, as an alternative embodiment, it would be possible to use the laser ray which is emitted rearwards from the laser tube 1 for entering the light detector. This is shown in FIG. 2 by two-dotted lines, and in this figure the alternative position of the light detector is designated by 4a. In this case no beam splitter such as 3 needs to be used, and therefore this element must be omitted, in this embodiment.

Various other modifications are also possible. For instance, although the preferred embodiment utilizes an acoustic-optical modulator element, there are other possibilities. Therefore it is desired that the scope of the protection and monopoly granted should not be limited by any specific details of the drawings given herein, or of the embodiments described, which have all been given for the purposes solely of illustration, but only by the hereto appended claim.

What is claimed is:

1. A method for stabilizing the intensity of a light ray emitted by a light source and modulated in an optical modulator element according to control signals, comprising:
   detecting the change of intensity of the light ray before it enters the optical modulator element and producing correction signals in accordance therewith;
   amplitude-modulating a high-frequency carrier by the correction signals in reverse phase to the change of intensity of the light ray to produce corrected carrier signals;
   amplitude-modulating the corrected carrier signals by the control signals to produce modulator signals; and
   modulating the light ray by the modulator signals in the optical modulator element.

* * * * *